United States Patent [19]

Mino et al.

[11] Patent Number: 5,443,901
[45] Date of Patent: Aug. 22, 1995

[54] MAGNETIC RECORDING MEDIUM HAVING AN ADSORBED FILM OF MOLECULES COMPRISING TWO SPECIES OF STRAIGHT CARBON CHAIN MOLECULES

[75] Inventors: Norihisa Mino, Settu; Mamoru Soga, Osaka; Ogawa Kazufumi, Hirakata, all of Japan

[73] Assignee: Matsushita Electric Industrial Co., Ltd., Osaka, Japan

[21] Appl. No.: 155,244

[22] Filed: Nov. 22, 1993

Related U.S. Application Data

[63] Continuation of Ser. No. 831,052, Feb. 4, 1992, abandoned.

[30] Foreign Application Priority Data

Feb. 5, 1991 [JP] Japan .................. 3-036774
Apr. 30, 1991 [JP] Japan .................. 3-098911
Jun. 14, 1991 [JP] Japan .................. 3-143494

[51] Int. Cl.$^6$ ........................................ G11B 5/00
[52] U.S. Cl. ........................... 428/336; 428/446; 428/447; 428/689; 428/694 TF; 428/694 BF; 428/701; 428/702; 428/900
[58] Field of Search ............... 428/446, 447, 694, 695, 428/702, 900, 694 TF, 694 BF, 694 TP, 694 BP, 689, 701, 336

[56] References Cited

U.S. PATENT DOCUMENTS

| | | | |
|---|---|---|---|
| 4,539,061 | 9/1985 | Sagiv .................. | 156/278 |
| 4,578,299 | 3/1986 | Kato et al. ............ | 428/65 |
| 4,761,316 | 8/1988 | Ogawa et al. .......... | 428/64 |
| 4,863,794 | 9/1989 | Fujii ................... | 428/325 |
| 4,902,585 | 2/1990 | Ogawa et al. .......... | 428/694 |
| 5,055,359 | 10/1991 | Tsuno et al. .......... | 428/448 |
| 5,162,163 | 11/1992 | Ohta et al. ........... | 428/695 |
| 5,178,954 | 1/1993 | Norman et al. ......... | 428/422 |

FOREIGN PATENT DOCUMENTS

| | | |
|---|---|---|
| 0282188 | 9/1988 | European Pat. Off. . |
| 0386784 | 3/1990 | European Pat. Off. . |
| 0363924 | 4/1990 | European Pat. Off. . |

OTHER PUBLICATIONS

JP-A-61 016 910 (Hitachi Cable KK), Jan. 24, 1986 (abstract).
Eiji Ando et al., "Thin Solid Films", vol. 180, No. 1, Nov. 21, 1988, pp. 287-291.

*Primary Examiner*—Stevan A. Resan
*Attorney, Agent, or Firm*—Fish & Richardson

[57] ABSTRACT

A magnetic recording film, which has excellent slip durability, is run-proof and wear-proof as well as self-lubricating, is obtained by forming a chemically adsorbed film composed of straight carbon chain surface active materials having different carbon numbers, the chemically adsorbed film being chemically bonded via siloxane covalently bonds.

In the method of manufacture, a magnetic recording medium, e.g., a hard disk, is contacted with a solution which is made by dissolving a straight carbon chain surface active material having a chlorosilyl group at one end and a fluorocarbon or hydrocarbon group at the other end in a non-aqueous solvent, thereby chemically bonding the chlorosilane-based straight chain surface active material to the surface of the magnetic recording medium via siloxane covalently bonds.

10 Claims, 4 Drawing Sheets

MAGNETIC RECORDING MEDIUM HAVING AN ADSORBED FILM OF MOLECULES COMPRISING TWO SPECIES OF STRAIGHT CARBON CHAIN MOLECULES

This application is a continuation of U.S. application Ser. No. 07/831,052 filed Feb. 4, 1992, now abandoned.

FIELD OF THE PRESENT INVENTION

The present invention relates to magnetic recording media of high recording density utilized in information industries and the like. More particularly, the invention relates to magnetic recording media provided with self-lubricating films.

BACKGROUND OF THE INVENTION

A prior art magnetic tape has been manufactured by coating a polyester film or like substrate with a magnetic material, e.g., ferrite particles, together with a solvent and, after drying, pressing the coating by calendar rollers. This magnetic tape is referred to as a coating type magnetic recording medium. When this coating type magnetic recording-medium uses a polyester film as a substrate, a substrate having as small a thickness as possible is selected to permit long use. To improve friction, thereby providing for a satisfactory running property (or slipping property), the film substrate is formed with fine surface irregularities by producing internal particles during manufacture of the polyester or by externally adding fine particles of silica or the like.

Recent research has focused on magnetic recording media which comprise a non-magnetic support provided with a ferromagnetic thin metal film formed thereon by plating, spattering, vacuum deposition, ion plating, etc. as high density magnetic recording media to replace conventional coating type magnetic recording media.

However, the magnetic recording media provided with ferromagnetic thin metal films formed in the above processes, have problems in near resistance and running. During the recording and reproduction of a magnetic signal, a magnetic recording medium is moved at high speed relative to a magnetic head or guide. The magnetic recording medium should run smoothly and stably. The ferromagnetic thin metal film which is produced by any of the above processes, however, can not withstand stringent conditions during the magnetic recording and reproduction. That is, it becomes unstable due to friction with the magnetic head. In addition, when it is driven for a long time, it may become worn or broken, or its output may be reduced due to generation of particles produced by wear. Accordingly, it has been proposed to form a monomolecular film of a saturated fatty acid or a metal salt thereof on the ferromagnetic thin metal film (Japan Tokkai Sho 50-75001/1975).

However, if fine surface irregularities formed on the film surface include even very slight projecting portions, such portions can be transferred to the recording medium which is in contact with the film when the film is wound on it. In this situation, recording may no longer be possible, and breakage may result.

In many of the high density magnetic recording media, the initial lubricating property may be slightly improved by adopting such means as disclosed in Japan Tokkai Sho 50-75001/1975. However, slip durability is lacking, and the running stability and wear resistance are undesirable. This is attributable to a weak physical adsorption between the unsaturated fatty acid monomolecular film and the ferromagnetic thin metal film as well as to the consequent scraping-off of unsaturated fatty acid by the magnetic head which is in frictional contact with the running recording medium.

Lubricants for magnetic recording media will now be considered.

As conventional lubricants, there are solid and liquid lubricants. Solid lubricants have become obsolete because it is difficult to coat them uniformly. Liquid lubricants are used to form lubricant films by spin coating or dipping. However, they are coated to thicknesses of at least 50 angstroms. Therefore, limitations are imposed when films are disposed closer to magnetic heads as a result of increasing the density and capacity of the films. Besides, lubricants are readily collected in depressed portions of the fine surface irregularities in the magnetic recording medium. Lubricants are scarcely found on raised portions of the surface, the wear of which is due to contact between the head and magnetic recording medium. Moreover, it is difficult to accurately control the amount of lubricant when applied as it many spatter if applied excessively. Therefore, requirements for the lubricant film have not been met.

SUMMARY OF THE INVENTION

An objective of the invention is to provide a magnetic recording medium comprising a ferromagnetic film formed on a non-magnetic substrate, and a chemically adsorbed film containing siloxane bonds formed on the ferromagnetic film or the non-magnetic substrate.

It is preferable in this invention that an inorganic oxide layer is formed on the ferromagnetic layer, and the chemically adsorbed film containing siloxane bonds is formed on the inorganic oxide layer.

It is preferable in this invention that the chemically adsorbed film contains a fluorocarbon or hydrocarbon group.

It is preferable in this invention that the chemically adsorbed film is a monomolecular film or a polymer film.

It is preferable in this invention that the substrate is a resin film or a disk.

It is preferable in this invention that the inorganic oxide layer comprises at least one compound selected from the group consisting of $SiO_2$, $TiO_2$ and $Al_2O_3$.

It is preferable in this invention that the inorganic oxide film has a thickness of 1 to 50 nanometers.

It is preferable in this invention that the inorganic oxide film is formed by spattering or deposition.

It is preferable in this invention that a siloxane-based inner layer is formed on the ferromagnetic layer, and the chemically adsorbed film containing siloxane bonds formed on an inner layer.

It is preferable in this invention that the chemically adsorbed film is formed on at least one surface of the magnetic recording medium, and comprises at least two different straight chain molecules having different carbon numbers bonded by siloxane covalently bonds.

It is preferable in this invention that the two or more different straight chain molecules with different carbon numbers contain a carbon fluorocarbon group at one end and a molecule containing a methyl group at another end.

It is preferable in this invention that the two or more straight chain molecules with different carbon numbers contain a $C_3$–$C_{25}$ carbon chain at the methyl group end.

It is preferable in this invention that the carbon number difference between the two or more different straight chain molecules with different carbon numbers is between 1 and 15.

Another objective of this invention is to provide a method of manufacturing a magnetic recording medium comprising:

contacting a substrate surface with a non-aqueous solution containing a surface active material having fluorocarbon groups and chlorosilane groups, the substrate surface having active hydrogen groups;

removing unreacted surface active material remaining on the substrate by washing the substrate with a non-aqueous organic solution to form an adsorbed monomolecular precursor film;

reacting unreacted chlorosilane groups on the adsorbed monomolecular precursor film with water after the removing step; and drying the adsorbed monomolecular film.

It is preferable in this invention that the surface active hydrogen groups are selected from the group consisting of hydroxyl groups, amino groups, and imino groups.

It is preferable in this invention that the substrate surface is made hydrophilic prior to the contacting step by treating a plasma or corona in an oxygen or nitrogen.

It is preferable in this invention that the surface active material is $CF_3(CF_2)_n(R)_mSiX_pCl_{3-p}$ where n represents 0 or an integer, R represents an alkyl group, vinylene group, ethynylene group, or a substituted group containing a silicon atom, an oxygen atom, m represents 0 or 1, X represents a hydrogen atom or a substituted group consisting of an alkyl group or an alkoxyl group, and p represents 0, 1 or 2.

It is preferable in this invention that an inorganic oxide film is formed by spattering or vacuum deposition on a ferromagnetic layer, and the chemically adsorbed precursor film containing siloxane bonds is formed on the inorganic oxide layer.

It is preferable in this invention that the substrate surface is contacted with an inner layer of a non-aqueous solution containing a multi-functional surface active material having chlorosilane groups, the substrate surface having active hydrogen groups, thereby causing a chemical adsorption reaction, and a chemically adsorbed film containing siloxane bonds formed on the inner layer.

It is preferable in this invention that the chemically adsorbed film is formed on at least one surface of the magnetic recording medium, and comprises at least two different straight carbon chain molecules having different carbon numbers bonded by siloxane covalent bonds.

It is preferable in this invention that the two or more different straight carbon chain molecules with different carbon numbers contain a fluorocarbon group at one end and a molecule containing a methyl group at another end.

Another objective of this invention is to provide a method of manufacturing a magnetic recording medium comprising:

contacting the substrate surface with a non-aqueous solution, the non-aqueous solution containing a surface active material having fluorocarbon groups and chlorosilane groups and the substrate surface having active hydrogen groups;

reacting a precursor polymer film on the substrate surface which contains a silanol group by reacting the chlorosilane groups with water; and drying the adsorbed polymer film.

DETAILED DESCRIPTION OF THE INVENTION

Figure 1:
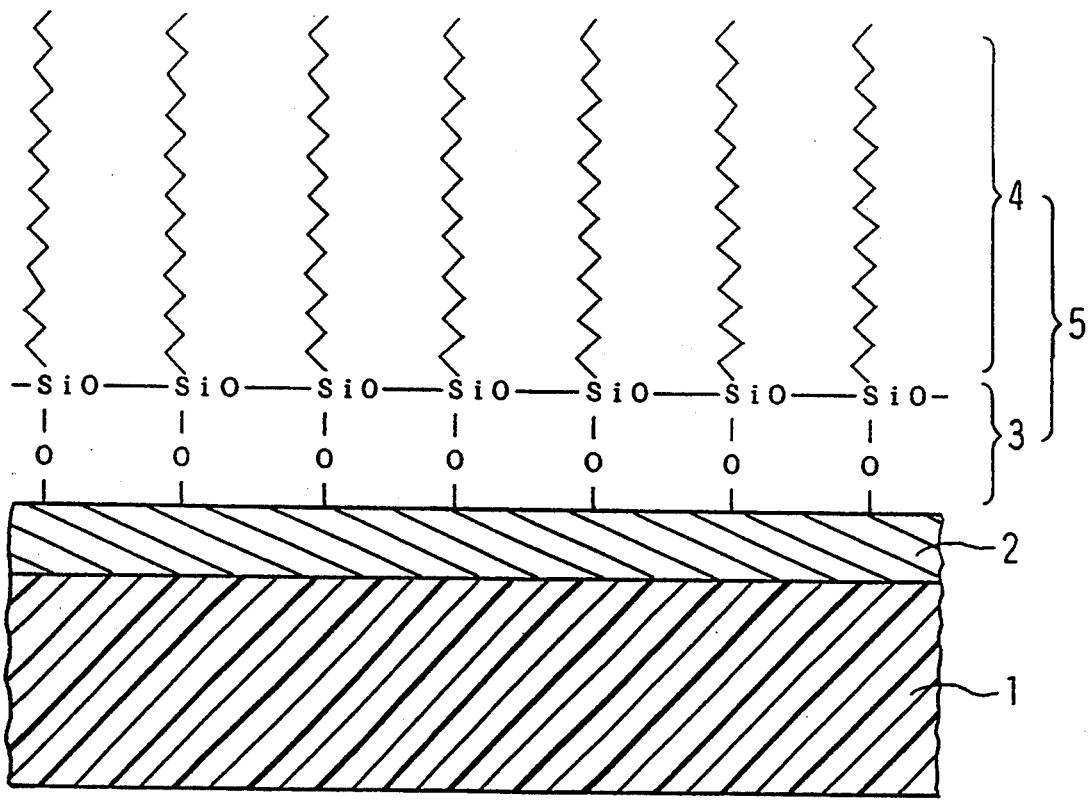
FIG. 1 is a schematic sectional view showing one embodiment of the invention, in which a chemically adsorbed film is formed via siloxane bonds on the surface of a ferromagnetic thin metal film formed on a non-magnetic substrate.

A magnetic recording film, which has excellent slip durability, is run-proof and wear-proof as well as self-lubricating, is obtained by forming a chemically adsorbed film composed of straight carbon chain surface active materials having different carbon numbers, the chemically adsorbed film being chemically bonded via siloxane covalent bonds.

In the method of manufacture, a magnetic recording medium, e.g., a hard disk, is contacted with a solution which is made by dissolving a straight carbon chain surface active material having a chlorosilyl group at one end and a fluorocarbon or hydrocarbon group at the other end in a non-aqueous solvent, thereby chemically bonding the chlorosilane-based straight carbon chain surface active material to the surface of the magnetic recording medium via siloxane covalently bonds.

According to the invention, a chemically adsorbed film chemically bonded by siloxane bonds is formed on at least one surface of a magnetic recording medium. Thus, it will not scrape off by friction between the magnetic head or various other parts and the magnetic recording medium during its running. A durable, run-proof and wear-proof magnetic recording medium having excellent slip thus can be obtained. In addition, its thickness is at the nanometer level, so that it will not deteriorate the functions of the magnetic recording medium or magnetic recording apparatus.

In a first preferred embodiment of the invention, a chemically adsorbed film containing siloxane bonds is formed on a ferromagnetic thin metal film or the surface of a substrate. It will not be scraped off by friction with the magnetic head or other parts in contact with it during running, because the chemically adsorbed film is directly chemically bonded (i.e., covalently bonded) by siloxane bonds to the ferromagnetic thin metal film and/or the surface of the substrate.

In a second preferred embodiment of the invention, a chemically adsorbed film is formed via siloxane bonds on an inorganic oxide layer. Thus, a dense chemically adsorbed film can be obtained, and it is possible to realize a further durable, run-proof and wear-proof magnetic recording medium having excellent slip properties.

In a further preferred embodiment of the invention, the chemically adsorbed film contains a fluorocarbon or hydrocarbon group, the fluorocarbon or hydrocarbon group being at its surface. It is thus possible to further improve the frictional characteristics.

In a further preferred constitution according to the invention, the chemically adsorbed film is a monomolecular film. It is thus possible to form a very thin film with a thickness at the nanometer level and which does not interfere with recording and other functions.

In a further preferred embodiment of the invention, the inorganic oxide layer contains $SiO_2$, $TiO_2$ or $Al_2O_3$, and is thus durable, run-proof and wear-proof and has excellent slip. Particularly, with the $SiO_2$ layer, a density of siloxane bonds can be obtained, and thus it is possible to form a dense chemically adsorbed film.

In a further preferred embodiment of the invention, the substrate is a resin film or a disk. Thus, it is possible to improve the drawbacks of such substrates, which are particularly desired to be durable, run-smoothly and wear-proof.

In a further preferred embodiment of the invention, the thickness of the inorganic oxide layer is 1 to 50 nm, and thus it will not deteriorate recording or other characteristics.

In a method of manufacture according to the invention, while a straight carbon chain surface active material containing a chlorosilyl group at one end is used, which is very reactive with water, a very low relative humidity is set up to bring about a reaction. Thus, a film as thin as the length of one molecule is formed uniformly such that it is chemically bonded to the metal oxide surface of a magnetic recording medium by a dehydrochlorination reaction brought about between hydroxyl groups at the oxide surface and the chlorosilyl groups. Further, it is possible to reduce the area of contact between the magnetic recording medium and magnetic head by varying the molecular length. Thus, it is possible to suppress friction or wear. By using a surface active material having a small molecular length and containing a fluorocarbon group, it is also possible to reduce wear due to inter-molecular friction and form a water- and oil-repelling film.

Figure 2:
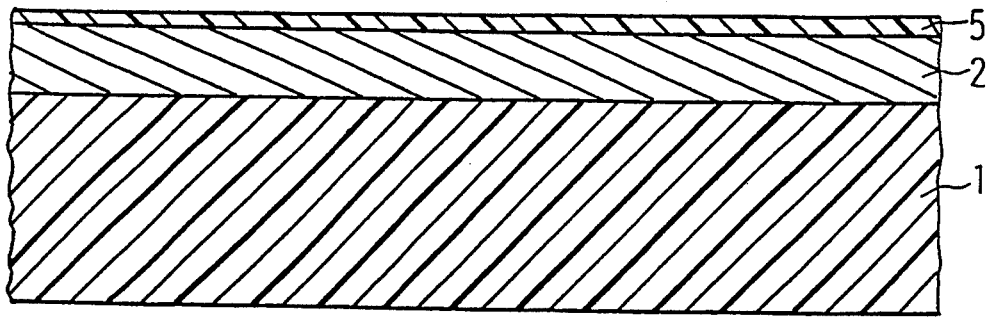
FIG. 2 is a schematic sectional view schematically showing FIG. 1.
Figure 3:
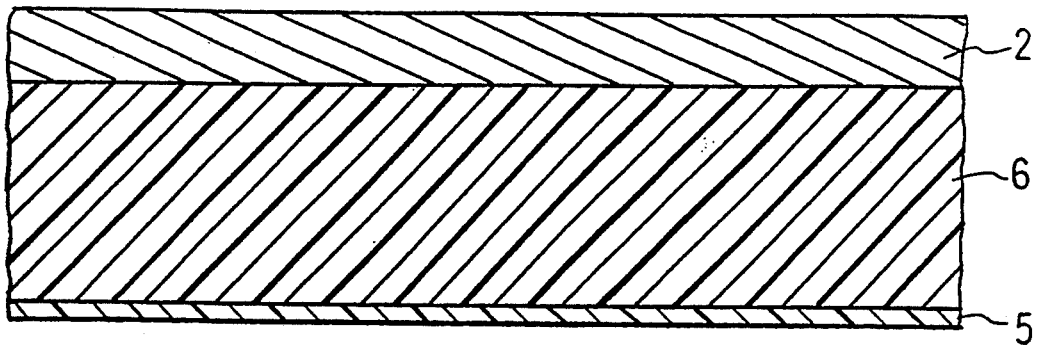
FIG. 3 is a schematic sectional view showing a different embodiment of the invention, in which a chemically adsorbed monomolecular film is formed via siloxane bonds to the back surface of a non-magnetic substrate.
Figure 4:
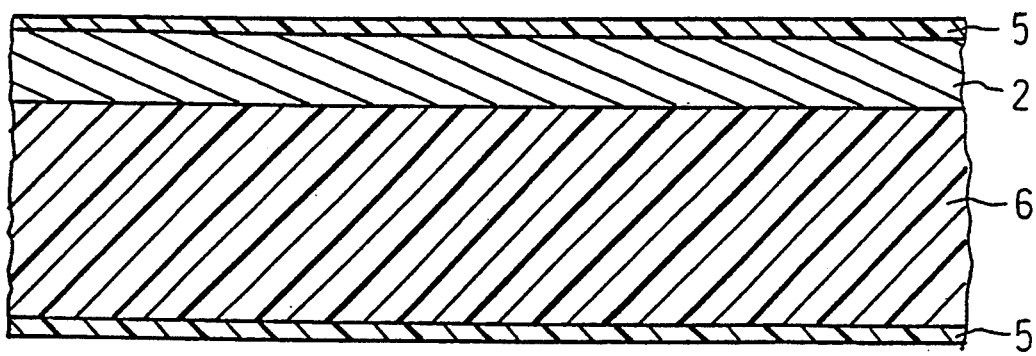
FIG. 4 is a schematic sectional view showing a further embodiment of the invention, in which chemically adsorbed monomolecular films are formed on the surface of a ferromagnetic thin metal film and another on the back surface of a non-magnetic substrate.

FIG. 1 shows an embodiment of the magnetic recording medium according to the invention. A chemically adsorbed film 4 is formed such that it is bonded by siloxane bonds 3 to the surface of a ferromagnetic thin metal layer 2 provided on a non-magnetic substrate 1. Designated at 5 is a chemically adsorbed monomolecular film having siloxane bonds 3 and chemically adsorbed film 4. FIG. 2 is a schematic sectional view of FIG. 1. FIG. 3 shows one embodiment which is useful for films or the like. A chemically adsorbed monomolecular film 5 is formed such that it is bonded by siloxane bonds to the back surface of a film substrate 6. FIG. 4 shows another embodiment, which is again useful for films or the like. In this case, a chemically adsorbed monomolecular film 5 is formed on the surface of a ferromagnetic thin metal film 2 provided on a film substrate 6 and also on the surface thereof.

Figure 5:
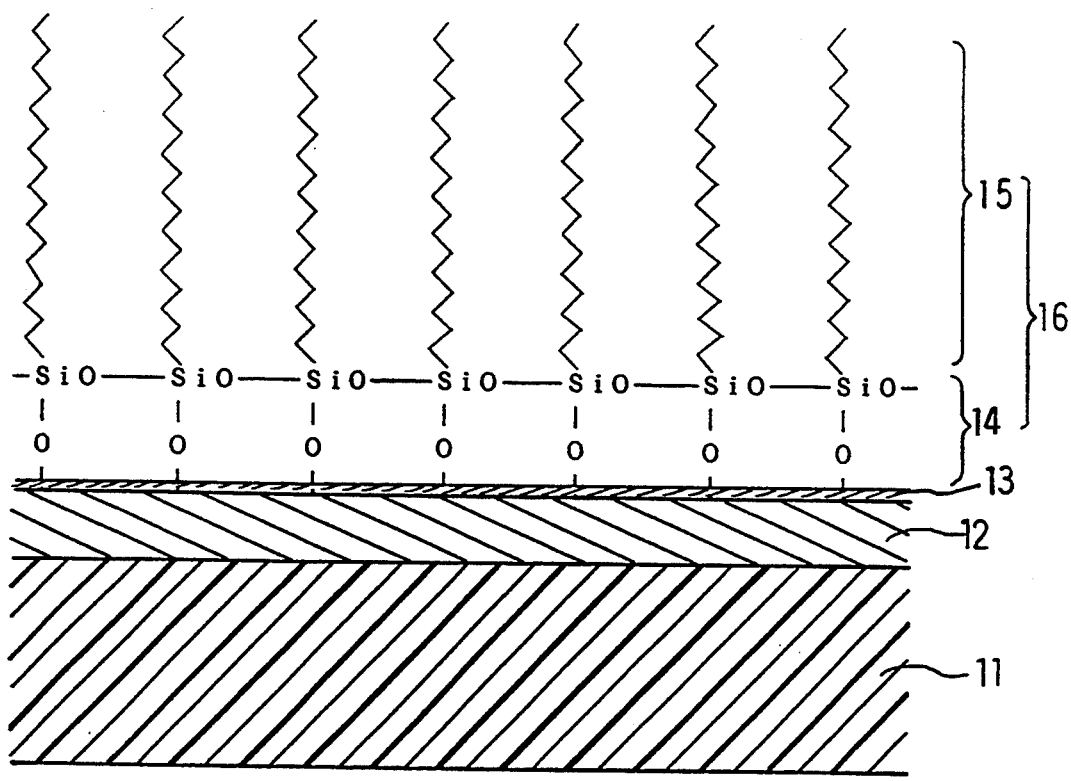
FIG. 5 shows an example, in which a metal oxide layer is formed on the surface of a ferromagnetic thin metal film on a substrate and a chemically adsorbed film is formed via siloxane bonds to the surface of the metal oxide layer.

FIG. 5 shows an embodiment in which a metal oxide layer 13 is provided on the surface of a ferromagnetic thin metal film 12 which is on a film substrate 11. A chemically adsorbed film 15 is formed via siloxane bonds 14 on the surface of the metal oxide layer 13. Designated at 16 is a chemically adsorbed monomolecular film.

Examples of the non-magnetic substrate 1 which can be used for magnetic recording medium according to the invention, are those films, plates, etc. which are made of such well-known materials as such polymers as poly(ethylene terephthalate), poly(ethylene 2,6-naphthalate), poly(ethylene sulfide), poly(vinylchloride), cellulose acetate, polyethylene, polypropylene, polycarbonate, polyimide and polyamide, non-magnetic metals, glass, and ceramics such as porcelain.

The ferromagnetic material for forming the ferromagnetic thin metal layer 2 of the magnetic recording medium according to the invention, may be any well-known material. Examples are iron, cobalt, nickel, alloys of these metals, and alloys of these materials with other metals such as manganese, chromium, titanium, yttrium, samarium and bismuth, as well as oxides of the metals noted above.

The ferromagnetic thin metal film 2 may be formed on the non-magnetic substrate 1 by well-known means such as vacuum deposition, spattering and metal plating or coating. $SiO_2$, $TiO_2$ and $Al_2O_3$ may be suitably used for transparency. $SiO_2$ permits high density formation of chlorosilane-based surface active material without pre-treatment with tetrachlorosilane because its surface contains hydroxyl groups at a high density like ordinary glass substrates.

The metal oxide layer 13 may be formed by spattering or vacuum deposition. The metal oxide layer 13 formed on the magnetic recording layer 12 according to the invention, preferably has a thickness of 1 to 50 nm. If the thickness exceeds 50 nm, separtion of the film or generation of cracks may occur. If the thickness is less than 1 nm, pin holes may be formed, making it difficult to form a chemically adsorbed film.

The monomolecular film of the chemically adsorbed film used for the magnetic recording medium according to the invention contains a chlorosilane-based surface active material containing a fluorocarbon or hydrocarbon group. Examples of the chlorosilane-based surface active material containing a fluorocarbon group are:

(1) trichlorosilane-based surface active materials such as $CF_3(CF_2)_7(CH_2)_2SiCl_3$, $CF_3CH_2O(CH_2)_{15}SiCl_3$, $CF_3(CH_2)_2Si(CH_3)_2(CH_2)_{15}SiCl_3$, $CF_3(CF_2)_3(CH_2)_2Si(CH_3)_2(CH_2)_9SiCl_3$, $CF_3(CF_2)_7(CH_2)_2Si(CH_3)_2(CH_2)_9SiCl_3$, $CF_3COO(CH_2)_{15}SiCl_3$, and $CF_3(CF_2)_5(CH_2)_2SiCl_3$.

(2) lower-alkyl group substituted monochlorosilane- or dichlorosilane-based surface active materials such as $CF_3(CF_2)_7(CH_2)_2SiCl_n(CH_3)_{3-n}$, $CF_3(CF_2)_7(CH_2)_2SiCl_n(C_2H_5)_{3-n}$,
$CF_3CH_2O(CH_2)_{15}SiCl_n(CH_3)_{3-n}$,
$CF_3CH_2O(CH_2)_{15}SiCl_n(C_2H_5)_{3-n}$,
$CF_3(CH_2)_2Si(CH_3)_2(CH_2)_{15}SiCl_n(CH_3)_{3-n}$,
$CF_3(CH_2)_2Si(CH_3)_2(CH_2)_{15}SiCl_n(C_2H_5)_{3-n}$,
$F(CF_2)_8(CH_2)_2Si(CH_3)_2(CH_2)_9SiCl_n(CH_3)_{3-n}$,
$F(CF_2)_8(CH_2)_2Si(CH_3)_2(CH_2)_9SiCl_n(C_2H_5)_{3-n}$,
$CF_3COO(CH_2)_{15}SiCl_n(CH_3)_{3-n}$, $CF_3COO(CH_2)_{15}SiCl_n(C_2H_5)_{3-n}$,
$CF_3(CF_2)_5(CH_2)_2SiCl_n(CH_3)_{3-n}$, and
$CF_3(CF_2)_5(CH_2)_2SiCl_n(C_2H_5)_{3-n}$ where n represents 1 or 2.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film. Further, $CF_3(CF_2)_n(CH_2)_2SiCl_3$ where n represents an integer, most suitably 3 to 25, is preferred because of its solubility and its water-repelling, anti-contaminating and other functional properties. Further, with an ethylene or acetylene group added to or incorporated in the fluorocarbon chain portion, the chemically adsorbed film may be crosslinked after formation by irradiating it with an electron beam of about 5 Mrads, thus further improving the hardness of the chemically adsorbed film.

Examples of the chlorosilane-based surface active material are such chlorosilane-based surface active materials as $CH_3(CH_2)_rSiX_pCl_{3-p}$, $CH_3(CH_2)_sO(CH_2)_tSiX_pCl_{3-p}$, $CH_3(CH_2)_uSi(CH_3)_2(CH_2)_vSiX_pCl_{3-p}$, and $CH_3COO(CH_2)_wSiX_pCl_{3-p}$, where r is from 1 to 25, s is from 0 to 12, t is from 1 to 20, u is from 0 to 12, v is from 1 to 20, w is from 1 to 25. These surface active materials are preferrably represented by the following examples:
$CH_3CH_2O(CH_2)_{15}SiCl_3$,
$CH_3(CF_2)_2Si(CH_3)_2(CH_2)_{15}SiCl_3$,
$CH_3(CH_2)_2Si(CH_3)_2(CH_2)_{15}SiCl_3$,
$CH_3(CH_2)_2Si(CH_3)_2(CH_2)_6SiCl_3$,
$CH_3(CH_2)_5Si(CH_3)_2(CH_2)_9SiCl_3$,
$CH_3COO(CH_2)_{15}SiCl_3$,
$CH_3(CH_2)_9(CH_2)_2SiCl_3$,
$CH_3(CH_2)_7(CH_2)_2SiCl_3$, and
$CH_3(CH_2)_5(CH_2)_2SiCl_3$ etc.
and such lower-alkyl group substituted monochlorosilane- or dichlorosilane-based surface active materials. Particularly, $$CH_3(CH_2)_nSiCl_3$$

where n represents an integer, most suitably 3 to 25, is preferred due to its solubility. Further, the alkyl groups in the chlorosilane-based surface active materials may contain an end vinyl group as in $$CH_2=CH-(CH_2)_nSiCl_3$$

where n represents an integer preferrably from 3 to 25.

The chlorosilane-based surface active material capable of use according to the invention is not limited to those in the form of a straight chain as noted above. It is possible to use a branched fluorocarbon or hydrocarbon group or those having a substituted fluorocarbon or hydrocarbon group with silicon at one end (i.e., those represented by the formula $R_2SiCl_2$, $R_3SiCl$, $R^1R^2SiCl_2$ or $R^1R^2R^3SiCl$ where R, $R^1R^2$ and $R^3$ represents an fluorocarbon or hydrocarbon group. To increase the adsorption density, however, the straight chain form is preferred.

Further, by chemically asdorbing a material for forming an inner layer material having a plurality of chlorosilyl groups, e.g., $SiCl_4$, $SiHCl_3$, $SiH_2Cl_2$, and $Cl(SiCl_2O)_nCl_3$ (where n represents an integer in a ragne from 1 to 20), $SiCl_m(CH_3)_{4-m}$, $SiCl_m(C_2H_5)_{4-m}$ (where m represents 1, 2 or 3), and $HSiCl_p(CH_3)_{3-p}$, $HSiCl_p(C_2H_5)_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane ($SiCl_4$) is preferred in that it is highly reactive and low in molecular weight. It can, therefore, provide silanol bonds at a high density. To this material, may be chemically adsorbed, for example, a chlorosilane-based surface active material containing a fluoroalkyl group. A chemically adsorbed film thus formed has an increased density and has enhanced slip durabilyty, and is run resistant, and wear resistant.

To form the chemically adsorbed film 4 for the magnetic recording medium according to the invention, a non-magnetic substrate 1 with a ferromagnetic thin metal film 2 formed thereon is dipped and held in a non-aqueous organic solution to adsorb a chlorosilane-based surface active material containing a fluorocarbon or hydrocarbon group to the ferromagnetic metal thin film 2. The substrate is then washed with a non-aqueous solvent, then with water, and then dried.

The non-aqueous organic solvent used for the method of manufacturing a magnetic recording medium according to the invention may be any organic solvent which does not dissolve the non-magnetic substrate on which the ferriomagnetic thin metal film 2 is formed and which does not react with the chlorosilane-based surface active agent. Examples of such a solvent include fluorine-based solvents such as 1,1-dichloro-1-fluoroethane, 1,1-dichloro-2,2,2-trifluoroethane, 1,1-dichloro-2,2,3,3,3-pentafluoropropane, 1,3-dichloro-1,1,2,2,3-heptafluoropropane, tertiary amine containing a fluorocarbon group and cyclic ether containing a fluorocarbon group, such hydrocarbon-based solvents as hexane, octane, hexadecane and cyclohexane, such ether-based solvents as dibutylether and dibenzylether and such ester-based solvents as methyl acetate, isopropyl acetate and amyl acetate. Ketone-based solvents may also be used. Examples are acetone and methylketone.

As the chemically adsorbed film 4 formed on the surface of the ferromagnetic thin metal film according to the invention, a single chemically adsorbed monomolecular film provides sufficient functions. A single chemically adsorbed monomolecular film may be formed by chemically adsorbing a chlorosilane-based surface active material or a material containing a plurality of chlorosilyl groups and then washing with a non-aqueous solvent without contact with water. No other specific treatment is necessary. Of course, it is possible to form a chemically adsorbed film as a laminated monomolecular film. A chemically adsorbed film formed on the recording medium side preferably has a thickness of 50 nm or less. If the thickness exceeds 500 nm, output reduction results due to a spacing loss in signal reproduction. When forming a chemically adsorbed film on the the film substrate, there is no limitation on thickness.

Now, specific examples of the invention will be given.

EXAMPLE 1

A ferromagnetic thin metal film composed of 90 wt. % of cobalt and 10 wt. % of chromium and having a thickness of 150 nm was produced by vacuum deposition on a polyimide film substrate having a thickness of 20 microns (μm). A piece measuring 100 mm by 100 mm was cut from the substrate provided with the ferromagnetic thin metal film. The piece was dipped and held for 60 minutes in a freon 113 solution containing $10^{-2}$ mol/l of heptadecafluorodecyltrichlorosilane $CF_3(CF_2)_7(CH_2)_2$—$SiCl_3$] as the chlorosilane-based surface active material containing a fluorocarbon group. This step was carried out in a nitrogen atmosphere at room temperature. Since the surface of the substrate contained hydroxyl groups, a dehydrochlorination reaction between the chlorosilyl groups of the chlorosilane-based surface active material and the hydroxyl groups formed covalently bond on the surface. This reaction is represented in the following formula [1].

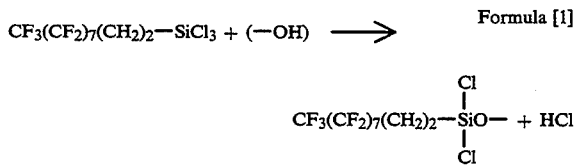

Formula [1]

The substrate was then washed by freon 113 to remove the unreacted material remaining on the surface, followed by washing with water or exposing to air containing moisture. The —SiCl group was changed to a —SiOH group as in formula [2].

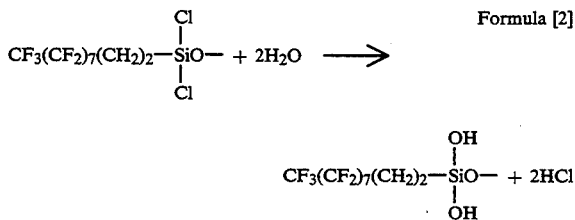

Formula [2]

Each silanol group (—SiOH) was then dehydrated and crosslinked to form a siloxane bond (—SiO—) after drying as in formula [3]. Drying temperature may be room temperature or above.

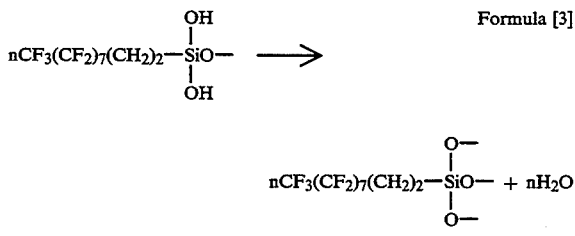

Formula [3]

An adsorbed monomolecular film was obtained on the surface of the substrate as shown FIG. 1. The adsorbed monomolecular film 5 has a fluorocarbon group 4 and is chemically bonded (i.e., covalently bonded) 3 to the substrate. The chemical bond is via a siloxane bond. The formation of chemically adsorbed monomolecular film 5 was measured by FTIR spectrometry and the thickness was about 1.5 nanometers (nm). It was firmly bonded such that it did not separate.

The above washing step with the non-aqueous organic solution (freon 113) was omitted, and a fluorine-based polymer film was adsorbed to the substrate surface. The fluorocarbon-based polymer film was in satisfactorily close adherance to the substrate. The film was substantially pin-hole free.

EXAMPLE 2

The same experiment as in Example 1 was carried out except that decafluorooctyltrichlorosilane was used in lieu of heptadecafluorotrichlorosilane.

EXAMPLE 3

The same experiment as in Example 1 was carried out except for the use of perfluorodecyltrichlorosilane in lieu of heptadecafluorodecyltrichlorosilane.

EXAMPLE 4

The same experiment as in Example 1 was carried out except for the use of a dry sample, which was obained by dipping and holding the substrate provided with the ferromagnetic thin metal film in Example 1 for 60 minutes in a cyclohexane solution containing 1% by weight of tetrachlorosilane in a nitrogen atmosphere at room temperature, followed by washing away unreacted tetrachlorosilane with cyclohexane and then washing with pure water.

EXAMPLE 5

The same experiment as in Example 1 was carried out except for the use of 19-trimethylsilyl-18-nonadecenyltrichlorosilane in lieu of heptadecafluorooctyltrichlorosilane. The chemically adsorbed film thus formed was irradiated for one minute with an electron beam of 5 Mrads.

COMPARATIVE EXAMPLE 1

In lieu of the chemically adsorbed film in Example 1, a single monomolecular film of stearic acid Ba was formed by a Langmuir-Blodgett's (LB) technique process.

The dynamic friction coefficients of Examples 1 to 5 and Comparative example 1 were measured using a frictional wear gauge ("DFPM" by Kyowa Kaimen Kagaku Co., Ltd.). This measuring instrument had a head made of a steel ball having a diameter of 3 mm. The measurements were carried out with a head load of 100 g and at a running speed of 1.0 mm/s. The results are shown in Table 1.

TABLE 1

|  | The dynamic friction coefficients | |
|---|---|---|
|  | Initially | After 200 reciprocations |
| Example 1 | 0.15 | 0.15 |
| Example 2 | 0.14 | 0.14 |
| Example 3 | 0.12 | 0.12 |
| Example 4 | 0.13 | 0.13 |
| Example 5 | 0.19 | 0.19 |
| Com. Ex. 1 | 0.25 | 0.54 |

As is seen from data in Table 1, it was confirmed that with the mangetic recording media in Examples 1 to 5 the dynamic friction coefficient remained low even after 200 reciprocations, thus showing superior slip durability compared to that in the Comparative example 1. In Comparative example 1, the monomolecular layer of stearic acid Ba was scraped off by the head because it was weakly bonded to the magnetic layer. The dynamic friction coefficient increased as head reciprocation increased.

A disk-like piece having a diameter of 75 mm was cut from each of the above magnetic recording media and run in a tester having the same function as a commercially available floppy disk. Stable running could be obtained with the magnetic recording media of Examples 1 to 5 even after 100 hours, and no scar or scratch was recognized.

With the magnetic recording medium in Comparative example 1 the running was unstable, and scars and scratches were recognied on the magnetic surface.

While the above examples concerned magnetic disks, the magnetic recording medium according to the invention is suitable magnetic tapes and magnetic cards as well. This invention is also applicable to magnetic recording media using perpendicular magnetic recording films.

EXAMPLE 6

A composition of 300 parts by weight of Maghemite ($\gamma$-$Fe_2O_3$), 40 parts by weight of vinyl chloride-vinyl acetate copolymer (with the copolymeration ratio in % by weight being 87:13 and a molecular weight of about 400), 30 parts by weight of an epoxy regin (a product of reaction between bisphenol A and epichlorohydrin, with a hydroxyl group content of 0.16, and having a molecular weight of about 470 and an expoxy content of 0.36 to 0.44), 5 parts by weight of silicone oil, 7 parts by weight of ethylamide toluenesulfonate, 250 parts by weight of ethyl acetate and 250 parts by weight of methylethylketone, was put into ball mill and kneeded for dispersion, and then 20 parts by weight of polyisocyanate (3 moles of tolylenediisocyanate and 1 mol of trimethylolpropane) was added. The resultant system was kneeded for uniform dispersion to obtain a magnetic coating material. This coating material was coated on a tape-like poly(ethylene terephthalate) substrate 11 having a thickness of 18 microns ($\mu$m) and a width of 600 mm such that the dry thickness of the coating was 7 microns ($\mu$m). Then, the coating was magnetic filed oriented in a DC magnetic field of 1,000 Oe and then thermally treated at 80° C. for 10 hours to promote hardening of the binder. Subsequently, the binder layer was pressed using super-calender rollers for compacting. Then, $SiO_2$ was deposited by spattering on the surface of the binder layer to form a metal oxide layer 13 having a thickness of 10 nm (FIG. 5).

The magnetic tape which was obtained in this way, was dipped and held for 60 hours in a freon-113 solution containing $10^{-2}$ mol/l of heptadecafluorodecyl-trichlorosilane as the fluorocarbon group containing a chlorosilane-based surface active material in a nitrogen atmosphere at room temperature. Unreacted heptadecafluorodecyl-trichlorosilane was washed away with freon-113 and then with pure water. In this way, a monomolecular film 15 containing a fluorocarbon group was formed via cyclohexane bonds 14 on the surface of the $SiO_2$ layer 13. Designated at 16 is the chemically adsorbed momomolecular layer.

It was recognized that the magnetic tape obtained in this way, has excellent frictional properties, with the dynamic friction coefficient being constant at 0.15 initially and after 200 reciprocations.

Further, a metal oxide layer of $SiO_2$ was formed at a thickness of 10 nm on the surface opposite the binder layer (i.e., polyester substrate surface). The tape was similarly dipped and held for 60 minutes in a freon-113 solution containing 10 mol/l of heptadecafluorodecyl-trichlorosilane as the fluorocarbon group containing chlorosilane-based surface active material in a nitrogen atmosphere at room temperature. Unreacted heptadecafluorodecyltrichlorosilane was washed away with freon-113 and then with pure water, thus forming a chemically adsorbed monomolecular film containing an fluorocarbon group via siloxane bonds. As in the above case, frictional properties were excellent.

EXAMPLE 7

Among the magnetic recording media according to the invention, are magnetic tapes, opto-magnetic recording disks and hard disks. Among substrates for magnetic recording media are films, plates, etc. of such polymers as poly(ethylene terephthalate), poly(ethylene-2,6-naphthalate), poly(phenylene sulfide), polyvinyl chloride, cellulose acetate, polyethyelene, polypropylene, polycarbonate, polyimide and polyamide, nonmagnetic metals, and glass ceramics such as porcelain. The magnetic recording medium may use a well-known material, for example iron, cobalt, nickel, alloys of these metals, alloys of these materials with other metals such as manganese, chromium, titanium, phosphorus, yttrium, samarium and bithmus, as well as oxides of the above metals. The magnetic recording material is provided on the substrate by such well-known means as vacuum deposition, spattering and metal plating or coating.

According to the invention, a chemically adsorbed film may be formed using two or more different straight chain surface active materials with different carbon numbers, the straight chain surface active materials being chlorosilane-based and containing a methyl or fluorocarbon group at one end. For example those represented by formulas 4 and 5.

  Formula [4]

  Formula [5]

(wherein $15 \geq k-(1+m) \geq 1$, $k \geq 1$, $1 \geq 0$, $m \geq 0$)

The compounds of formula 4 are preferred to those of formula 5 because the straight chain carbon number is greater. Preferably, the carbon number difference is in a range between 1 and 15. Further, the carbon number 1 in Formula 5 is preferably in a range of 0 to 17. It is possible to use three or more different surface active materials as long as the above conditions are satisfied. Similar chemically adsorbed films may be formed by using lower-alkyl groups substituted by dicyclosilane- or monochlorosilane-based materials. Similar effects are also obtainable with surface active materials other than the chlorosilane-based ones noted above. For example those based on halosilane, and those not based on silicon, e.g., based on titanium, i.e., chlorotitanium-based surface active materials may be used.

The method of manufacturing a magnetic recording medium according to the invention comprises the steps of dipping the medium in a non-aqueous organic solution containing straight carbon chan surface active materials, and removing excess surface active materials from the medium using an organic solvent. Since the chlorosilyl groups in the surface active materials are very active with respect to water, in both of the above steps as dry a state as possible should be maintained preferably using dry nitrogen gas or the like. Preferably, the steps are carried out in an atmosphere having a relative humidity of 25% or below.

Figure 6:
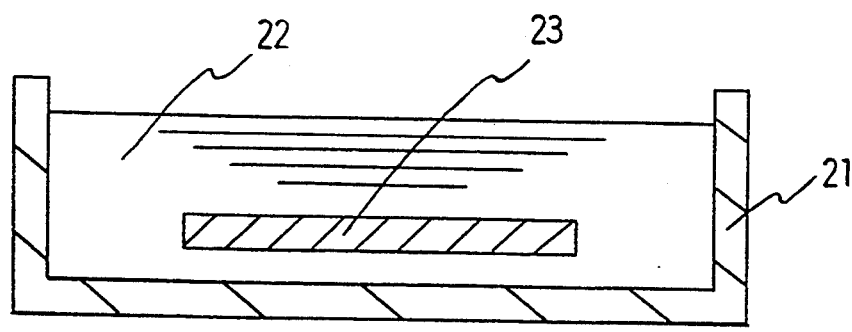
FIG. 6 is a schematic view for explaining a method of forming a chemically adsorbed film on a magnetic recording medium according to the invention.
Figure 7:
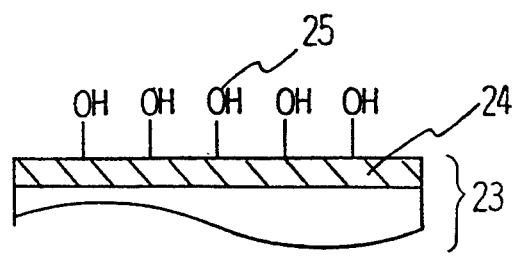
FIG. 7 is a schematic sectional view, enlarged to a molecular level, showing a magnetic recording medium surface prior to treatment with respect to a first embodiment of the magnetic recording medium according to the invention.

As surface active materials were used octadecyl-trichlorosilane manufactured by Shinetsu Kagaku Kokgyo Co., Ltd. and heptafluoroethyl-trichlorosilane manufactured by Toshiba Silicon Co., Ltd. These surface active materials were dissolved in their mole ratio of 1:1 and by 1 millimol/l in a non-aqueous mixed solution containing hexadecane manufactured by Aldrich, chloroform manufactured by Kanto Kagaku Co., Ltd. and carbon tetrachloride in a weight ratio of 80:12:8, thus preparing a surface active material solution 22 (FIG. 6). This solution was preserved in a sealed polytetrafuloroethylene container. Then, a vessel 21 for dipping a aluminium hard disk substrate 23 was put into a dry glove bag, i.e., the glove bag was held at a relative humidity of 10%, and then the surface active material solution 22 was poured into the vessel 21. A hard disk 23 was magnetic recording medium. After treatment and washing, the disk was dipped and held in the surface active material solution 22 for one hour. The hard disk had a surface oxide film 25 containing numerous exposed hydroxyl groups 25 (FIG. 7). Within one hour of dipping, a dehydrochlorination reaction proceeded between hydroxyl groups 25 at the hard disk surface and trichlorosilane groups, thus forming siloxane bonds represented by formulas 6 and 7:

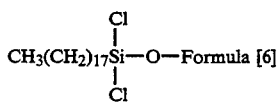

Formula [6]

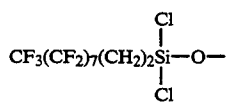

Formula [7]

The ratios of the surface active materials which formed the thin film on the hard disk were substantially the same as that of the solution prepared for dipping.

Figure 9:
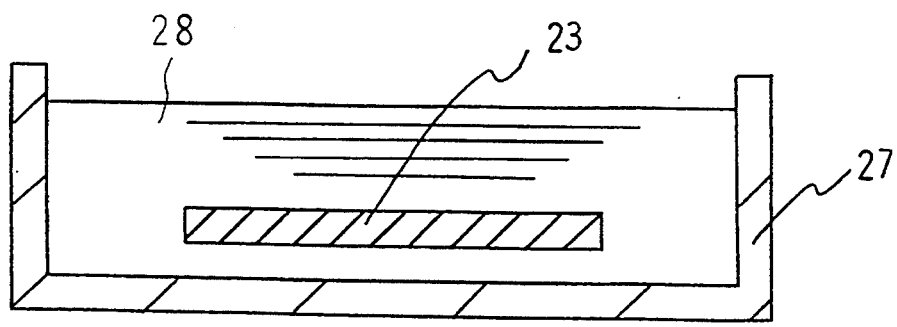
FIG. 9 is a schematic view illustrating a method of manufacture for washing away excess surface active material after formation of a chemically adsorbed film on a magnetic recording medium surface according to the invention.

Subsequently, the glove bag inside was set to a relative humidity of 10%. A washing vessel 27 containing chloroform was placed in the glove bag. The hard disk 23 was taken out of the surface active material liquid and placed in the washing vessel 27 for washing by agitation with a stirrer for 15 minutes. Washing was repeated affect replacing the chloroform 28 (FIG. 9). In this operation, unreacted surface active materials which were not chemically bonded but only physically adsorbed to the hard disk were removed. Followed by washing with water or exposing to air containing moisture. The —SiCl group was changed to a —SiOH group as by formulas 8 and 9:

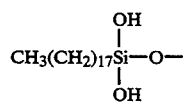

Formula [8]

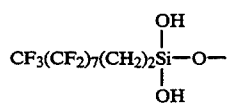

Formula [9]

Each silanol group (—SiOH) was then dehydrated and crosslinked to form a siloxane bond (—SiO—) after drying as by formulas 10 and 11.

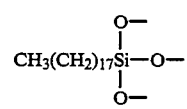

Formula [10]

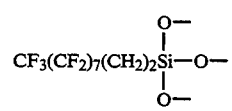

Formula [11]

Figure 8:
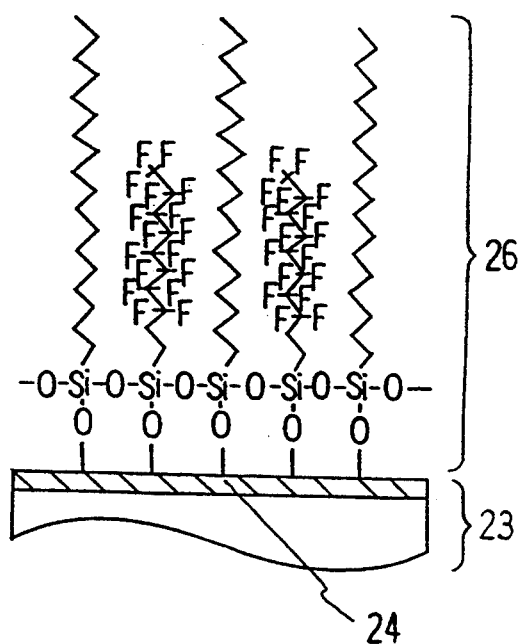
FIG. 8 is a schematic sectional view, enlarged to a molecular level, showing the magnetic recording medium surface after treatment with respect to a first embodiment of the magnetic recording medium according to the invention.

Thus, the hard disk was uniformly covered with a chemically adsorbed film 26 (FIG. 8). In the above sequence of steps, a chemically adsorbed film 26 composed of two different surface active materials, i.e., octadecylsilane and heptafluoroethylsilane, was formed on the hard disk. The film had a thickness corresponding to the molecular length (i.e., 2.5 nm). The hard disk with the thin film formed thereon in the above way had a dynamic friction coefficient of 0.1 or below, as measured under a load of 20 g after 200 reciprocations, and was thus found to withstand actual use.

EXAMPLE 8

A ferromagnetic thin metal film composed of 90% by weight of cobalt and 10% by weight of chromium and having a thickness of 150 nm, was formed by vacuum deposition on a polyimide film substrate having a thickness of 20 microns. A piece of 100 mm by 100 mm was cut from the substrate thus provided with the ferromagnetic thin metal film, and was dipped and held in a surface active material solution which was prepared by dissolving octadecyltrichlorosilane manufactured by Shinetsu Kagaku Kogyo Co., Ltd. and heptafluoroethyl-trichlorosilane manufactured by Toshiba Silicon Co., Ltd. in a mole ratio of 1:1 and by 1 millimol/l in a nonaqueous freon-113 solution within a dry glove bag which was held at a relative humidity of 10% using dry nitrogen gas, followed by washing away unreacted surface active materials with freon-113, followed by washing with water or exposing to air containing moisture and dryed. A chemically adsorbed film of the surface active materials of octadecylsilane and heptafluoroethylsilane was thus formed on the ferromagnetic thin metal film via siloxane bonds. It had a thickness corresponding to the molecule length of the surface active materials used (i.e., about 2.5 nm). This polyimide film with the thin film formed thereon had a dynamic friction coefficient of 0.1 or less as measured under a load of 20 g after 200 reciprocations.

The above examples are primaring concerned with hard disks and magnetic tapes, but the magnetic recording medium according to the invention is also applicable to magnetic disks, magnetic cards and opto-magnetic recording disks. Further, with a magnetic tape the chemically adsorbed film according to the invention may be formed on the recording material layer side or on the resin support layer side.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A magnetic recording medium comprising a ferromagnetic film formed on a non-magnetic substrate, and a chemically adsorbed film containing siloxane groups formed on surface of at least one of said ferromagnetic film and said non-magnetic substrate, wherein said chemically adsorbed film comprises at least first and second straight carbon chain molecules covalently bonded to said surface or surfaces by siloxane groups at one end of each molecule, wherein said first straight carbon chain molecules contain a fluorocarbon group on the end of each bonded to a surface and said second straight carbon chain molecules contain a $C_3$–$C_{25}$ carbon chain and a methyl group on the end of each molecule not bonded to surface, and wherein the first and second straight carbon chain molecules have a difference in the number of carbon atoms in the chain of between 1 and 15.

2. The magnetic recording medium according to claim 1, wherein an inorganic oxide layer is formed on said ferromagnetic film, and said chemically adsorbed film containing siloxane bonds is formed on said inorganic oxide layer.

3. The magnetic recording medium as in claim 1, further comprising a siloxane-based inner layer formed on said ferromagnetic film.

4. The magnetic recording medium according to claim 1 or 2, wherein said chemically adsorbed film is a monomolecular film or a polymer film.

5. The magnetic recording medium according to claim 1 or 2, wherein said substrate is a resin film or a disk.

6. The magnetic recording medium according to claim 2, wherein said inorganic oxide layer comprises at least one compound selected from the group consisting of $SiO_2$, $TiO_2$ and $Al_2O_3$.

7. The magnetic recording medium according to claim 2, wherein said inorganic oxide film has a thickness of 1 to 50 nanometers.

8. The magnetic recording medium according to claim 2, wherein said inorganic oxide film is formed by sputtering or deposition.

9. The magnetic recording medium according to claim 1, wherein said straight carbon chain molecules each is covalently bonded via SiO to the surface of the magnetic recording medium only at one end.

10. The magnetic recording medium according to claim 3, wherein said straight carbon chain molecules each is covalently bonded via SiO to the surface of the magnetic recording medium only at one end.

* * * * *